United States Patent

Gutierrez et al.

[11] Patent Number: 5,296,560
[45] Date of Patent: Mar. 22, 1994

[54] ASHLESS DISPERSANTS

[75] Inventors: Antonio Gutierrez, Mercerville; Robert D. Lundberg, Bridgewater; Robert A. Kleist, Bayonne, all of N.J.

[73] Assignee: Exxon Chemical Patents Inc., Linden, N.J.

[21] Appl. No.: 88,493

[22] Filed: Aug. 6, 1993

Related U.S. Application Data

[63] Continuation of Ser. No. 876,136, Apr. 29, 1992, abandoned, which is a continuation of Ser. No. 547,930, Jul. 3, 1990, abandoned.

[51] Int. Cl.$^5$ .............................................. C08F 8/32
[52] U.S. Cl. ............................ 525/327.6; 525/329.6; 525/329.9; 525/382
[58] Field of Search ............... 525/327.6, 329.6, 329.9

[56] References Cited

U.S. PATENT DOCUMENTS

| | | | |
|---|---|---|---|
| 3,959,374 | 5/1976 | Brennan et al. | 260/563 B |
| 4,234,435 | 11/1980 | Meinhardt et al. | 252/51.5 A |
| 4,844,827 | 7/1989 | Schaffhausen | 252/51.5 |

FOREIGN PATENT DOCUMENTS

| | | |
|---|---|---|
| 0271937 | 6/1988 | European Pat. Off. |
| 0335336 | 10/1989 | European Pat. Off. |
| 0400870 | 12/1990 | European Pat. Off. |
| 2520848 | 12/1975 | German Democratic Rep. |

*Primary Examiner*—Bernard Lipman
*Attorney, Agent, or Firm*—K. R. Walton

[57] ABSTRACT

According to the present invention, improved dispersants are provided which comprise adducts of (A) polymer-substituted mono- and dicarboxylic acid or anhydrides and (B) bis(para-amino cyclohexyl) methane oligomers, wherein the reactants are contacted in a reaction zone in the substantial absence of polar organic solvents.

8 Claims, No Drawings

ASHLESS DISPERSANTS

This is a continuation of application Ser. No. 876,136, filed Apr. 29, 1992 now abandoned which was a R.62 continuation of U.S. Ser. No. 547,930, filed Jul. 3, 1990, abandoned Apr. 29, 1992, which is based on P.M. 87 PMT 049.

FIELD OF THE INVENTION

This invention relates to improved nitrogen-containing dispersants useful in lubricating oils and fuels.

BACKGROUND OF THE INVENTION

Polyisobutenyl succinimides, prepared from the reaction of polyisobutenyl succinic anhydride and ethylene polyamines (e.g., tetraethylene pentamine) are widely used in commercial lubricating oils as dispersants and have also been suggested for use in fuels as dispersants.

SUMMARY OF THE INVENTION

According to the present invention, improved dispersants are provided which comprise adducts of (A) polymer-substituted mono- and dicarboxylic acid or anhydrides and (B) bis(para-amino cyclohexyl) methane oligomers. The preferred dispersants comprise adducts of polyisobutenyl-substituted succinic acid or anhydride and bis(para-amino cyclohexyl) methane oligomers.

It has been found that the dispersants of the present invention exhibit improved dispersing properties compared to conventional polyisobutenyl succinimide dispersants, as illustrated by reduced sludge and/or varnish deposits on engine parts.

The dispersants of this invention can also provide enhanced resistance to degradation of fluoroelastomeric engine seals in use of these dispersants in crankcase lubricating oils for internal combustion engines (e.g., gasoline engines, diesel engines, methanol-containing fueled engines, etc.).

DETAILED DESCRIPTION OF THE INVENTION

The present invent ion provides improved dispersants which comprise adducts of (A) polymer-substituted mono- and dicarboxylic acid or anhydrides and (B) bis(para-amino cyclohexyl) methane oligomers.

(A) POLYMER-SUBSTITUTED ACID/ANHYDRIDE MATERIALS

The long chain hydrocarbyl polymer-substituted mono- or dicarboxylic acid material, i.e., acid, anhydride or acid ester used in this invention, includes the reaction product of a long chain hydrocarbon polymer, generally a polyolefin, with a monounsaturated carboxylic reactant comprising at least one member selected from the group consisting of (i) monounsaturated $C_4$ to $C_{10}$ dicarboxylic acid (preferably wherein (a) the carboxyl groups are vicinyl, (i.e. located on adjacent carbon atoms) and (b) at least one, preferably both, of said adjacent carbon atoms are part of said mono unsaturation); (ii) derivatives of (i) such as anhydrides or $C_1$ to $C_5$ alcohol derived mono- or di-esters of (i); (iii) monounsaturated $C_3$ to $C_{10}$ monocarboxylic acid wherein the carbon-carbon double bond is conjugated to the carboxy group, i.e, of the structure

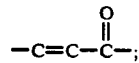

and (iv) derivatives of (iii) such as $C_1$ to $C_5$ alcohol derived monoesters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain non-acid substituted polymer. The polymer-substituted mono- or dicarboxylic acid material (also referred to herein as "functionalized" polymer or polyolefin), non-acid substituted polyolefin, and any other polymeric by-products, e.g. chlorinated polyolefin, (also referred to herein as "unfunctionalized" polymer) are collectively referred to herein as "product residue" or "product mixture". The non-acid substituted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e. increased or decreased by techniques known in the art, such modifications do not alter functionality as defined above. The terms "polymer substituted monocarboxylic acid material" and "polymer substituted dicarboxylic acid material" as used herein are intended to refer to the product mixture whether it has undergone such modification or not.

Accordingly, the functionality of the polymer substituted mono- and dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

Preferred olefin polymers for reaction with the monounsaturated carboxylic reactants to form reactant A are polymers comprising a major molar amount of $C_2$ to $C_{10}$, e.g., $C_2$ to $C_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Mixtures of polymers prepared by polymerization of mixtures of isobutylene, butene-1 and butene-2, e.g., polyisobutylene wherein up to about 40% of the monomer units are derived from butene-1 and butene-2, is an exemplary, and preferred, olefin polymer. Preferred are polyisobutenes as described in U.S. Pat. No. 4,935,576 (the disclosure of which is hereby incorporated by reference in its entirety) prepared as described therein. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight. Also useful are ethylene alpha-olefin copolymers having terminal unsaturation as described in U.S. Pat. No. 4,668,834, the disclosure of which is hereby incorporated by reference in its entirety.

The olefin polymers used in the formation of reactant A will have number average molecular weights within the range of about 300 to 10,000, generally from about 700 and about 5,000, preferably from about 1000 to 4,000, more preferably from about 1300 and about 3,000. Particularly useful olefin polymers have number average molecular weights within the range of about 1500 and about 3000, preferably with approximately one double bond (most preferably terminal double bond) per polymer chain. An especially useful starting material for highly potent dispersant additives useful in accordance with this invention is polyisobutylene, wherein up to about 40% of the monomer units are derived from butene-1 and/or butene-2. The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

The olefin polymers will generally have a molecular weight distribution (the ratio of the weight average molecular weight to number average molecular weight, i.e. $\overline{M}_w/\overline{M}_n$) of from about 1.0 to 4.5, and more typically from about 1.5 to 3.0.

The polymer can be reacted with the monounsaturated carboxylic reactant by a variety of methods. For example, the polymer can be first halogenated, chlorinated or brominated to about 1 to 8 wt. %, preferably 3 to 7 wt. % chlorine, or bromine, based on the weight of polymer, by passing the chlorine or bromine through the polymer at a temperature of 60° to 250° C., preferably 110° to 160° C., e.g. 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

Alternately, the polymer and the monounsaturated carboxylic reactant can be contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety.

Preferably, the polymers used in this invention contain less than 5 wt %, more preferably less than 2 wt %, and most preferably less than 1 wt % of a polymer fraction comprising polymer molecules having a molecular weight of less than about 300, as determined by high temperature gel premeation chromatography employing the corresponding polymer calibration curve. Such preferred polymers have been found to permit the preparation of reaction products, particularly when employing maleic anhydride as the unsaturated acid reactant, with decreased sediment. In the event the polymer produced as described above contains greater than about 5 wt % of such a low molecular weight polymer fraction, the polymer can be first treated by conventional means to remove the low molecular weight fraction to the desired level prior to initiating the ene reaction, and preferably prior to contacting the polymer with the selected unsaturated carboxylic reactant(s). For example, the polymer can be heated, preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as the polymer number average molecular weight, the amount of the low molecular weight fraction to be removed, the particular monomers employed and other factors. Generally, a temperature of from about 60° to 100° C. and a pressure of from about 0.1 to 0.9 atmospheres and a time of from about 0.5 to 20 hours (e.g., 2 to 8 hours) will be sufficient.

In this process, the selected polymer and monounsaturated carboxylic reactant and halogen (e.g., chlorine gas), where employed, are contacted for a time and under conditions effective to form the desired polymer substituted mono- or dicarboxylic acid material. Generally, the polymer and monounsaturated carboxylic reactant will be contacted in a unsaturated carboxylic reactant to polymer mole ratio usually from about 0.7:1 to 4:1, and preferably from about 1:1 to 2:1, at an elevated temperature, generally from about 120° to 260° C., preferably from about 160° to 240° C. The mole ratio of halogen to monounsaturated carboxylic reactant charged will also vary and will generally range from about 0.5:1 to 4:1, and more typically from about 0.7:1 to 2:1 (e.g., from about 0.9 to 1.4:1). The reaction will be generally carried out, with stirring for a time of from about 1 to 20 hours, preferably from about 2 to 6 hours.

By the use of halogen, about 65 to 95 wt. % of the polyolefin, e.g., polyisobutylene will normally react with the monounsaturated carboxylic acid reactant. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of mono- or dicarboxylic acid producing units to polyolefin, e.g., 1.1 to 1.8, etc. are based upon the total amount of polyolefin, that is, the total of both the reacted and unreacted polyolefin, used to make the product.

The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

If desired, a catalyst or promoter for reaction of the olefin polymer and monounsaturated carboxylic reactant (whether the olefin polymer and monounsaturated carboxylic reactant are contacted in the presence or absence of halogen (e.g., chlorine)) can be employed in the reaction zone. Such catalyst of promoters include alkoxides of Ti, Zr, V and Al, and nickel salts (e.g., Ni acetoacetonate and Ni iodide) which catalysts or promoters will be generally employed in an amount of from about 1 to 5,000 ppm by weight, based on the mass of the reaction medium.

(B) BIS(PARA-AMINO CYCLOHEXYL) METHANE OLIGOMERS (PACM OLIGOMERS)

The PACM oligomer materials employed in this invention comprise bis(p-amino cyclohexyl) methane (PACM) in admixture with isomers thereof and analogues thereof containing, on average, from 2 to 6 or higher (usually 3 to 4) cyclohexyl rings per PACM oligomer molecule. The PACM structure can be represented by the formula:

The PACM oligomers can be obtained, e.g., by fractionation, or distillation, as a heavies by-product or bottoms from the PACM-containing product produced by high pressure catalytic hydrogenation of methylenedianiline. The hydrogenation of methylene dianiline and the separation of PACM oligomers from the resulting hydrogenation product can be accomplished by known means, including the processes disclosed in U.S. Pat. Nos. 2,511,028; 2,606,924; 2,606,925; 2,606,928; 3,914,307; 3,959,374; 4,293,687; 4,394,523, 4,448,995 and 4,754,070, the disclosures of which are incorporated herein by reference in their entirety.

Bis(p-aminocyclohexyl)methane (PACM) in admixture with isomers thereof and analogs thereof containing three and four rings with either (1) an aliphatic hydrocarbon-substituted succinic anhydride or (2) an admixture of an aliphatic hydrocarbon-substituted phenol, formaldehyde and a fatty acid, such as oleic acid. This complex bis(primary amine) composition usually contains small amounts of methylene bis-aniline as well. These bis(primary amine) compositions are free from secondary amines and are available in solvent solution as PACM bottoms. Typically these compositions contain (by weight) about 16–23% bis(p-aminocyclohexyl)methane, and in addition, about 1–5% methylene bis-aniline, about 4–13% of isomers of bis(p-aminocyclohexyl)methane, and about 48–62% of analogs of bis(p-aminocyclohexyl)methane containing three and four rings. These complex compositions are commercially available from Air Products Company as PACM bottoms.

The PACM oligomers charged to the reaction zone of this invention are preferably substantially free of polar organic solvents (such as tetrahydrofuran, methanol, ethanol, butanol, ethylene glycol, dioxane, isopropanol, and the like) to avoid competing side reactions with those solvents (e.g., alcohols) which are reactive with the selected reactant (A) and to minimize the costs of, and waste streams generated in, the removal of polar solvents from the dispersant products of this invention. Preferably, the PACM oligomers charged to the reaction zone for reaction with reactant (A) contains not more than about 1 wt. % of polar organic solvents. If the PACM oligomer contain excess organic polar solvents, the solvents can be removed by distillation (e.g., under reduced pressure), inert gas stripping (e.g., $N_2$), and the like.

The PACM oligomers freed of such polar organic solvents can be readily handled by use of elevated temperatures (e.g., from above about 50° C.) or by dilution in non-polar organic solvents, such as mineral oils, and the like.

PREPARATION OF THE DISPERSANT

The selected PACM oligomers are readily reacted with the selected polymer substituted mono- or dicarboxylic acid material, e.g. alkenyl succinic anhydride,

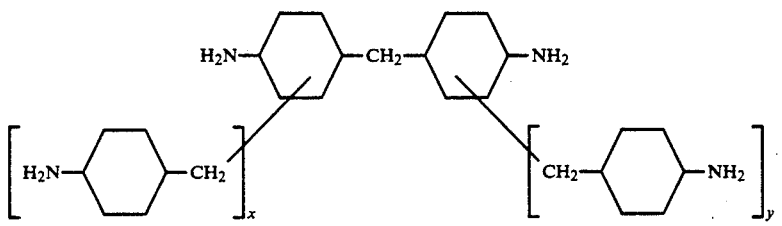

wherein x and y are the same or different and are integers of from 0 to 4, and preferably from 0 to 2, and wherein the sum of x+y is from 1 to 4, preferably from 1 to 2.

The total nitrogen content of the PACM oligomers will comprise generally from 8 to 16 wt. %, and preferably from 10 to 14 wt. %.

by heating an oil solution containing 5 to 95 wt. % of the polymer substituted dicarboxylic acid material to about 100° to 250° C., preferably 125° to 175° C., generally for 1 to 10, e.g., 2 to 6 hours, until the desired amount of water is removed. The heating is preferably carried out to favor formation of imides and/or amides, rather than salts. Generally from 1 to 5, preferably from about 1.5 to 3, moles of mono- or dicarboxylic acid moiety content (e.g., grafted maleic anhydride or grafted acrylic acid content) is used per primary nitrogen equivalent of the PACM oligomers.

Preferably, the polymer substituted mono- or dicarboxylic acid producing material and PACM oligomer will be contacted for a time and under conditions sufficient to form an adduct having within its structure, on average, at least 0.5 (e.g., from 0.5 to 20), and preferably at least 1 (e.g., from 1 to 15) reactive amine group (i.e., primary and/or secondary amino groups) per molecule. The progress of this reaction can be followed by infrared analysis.

The reactants should generally be contacted for reaction in a reaction zone in the substantial absence of a polar solvent (preferably in a reaction zone containing not greater than 1 wt. % polar solvent, based on the amount of reactant (B) charged to the reaction zone.

The reaction can be conducted in a batchwise, semi-continuous or continuous manner, in one or more separate reaction vessels, which can comprise any of the conventional vessels employed for dispersant forming processes (e.g., stirred reactors). Generally, the reaction will be conducted under $N_2$ or another inert gas to avoid oxidation of the reactants due to the presence of $O_2$ containing gas (e.g., air). Inert gas sparging of the reaction mass can be employed continuously or semi-continuously to remove water of reaction from the product mixture.

The dispersant-forming reaction is preferably conducted in a non-polar solvent (e.g., xylene, toluene, benzene and the like), and is preferably conducted in the presence of a mineral or synthetic lubricating oil.

The nitrogen-containing dispersant materials of the instant invention as described above are post-treated by contacting said nitrogen-containing dispersant materials with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, $C_1$ to $C_{30}$ hydrocarbyl substituted succinic acids and anhydrides (e.g., succinic anhydride, dodecyl succinic anhydride and the like), maleic anhydride (or any of the above discussed monounsaturated carboxylic reactants (A) useful in this invention), phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols.

For example, the nitrogen containing dispersants can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Usefully the borated dispersants of the invention contain from about 0.05 to 2.0 wt. %, e.g., 0.05 to 0.7 wt. % boron based on the total weight of said borated nitrogen-containing dispersant compound. The boron, which appears to be in the product as dehydrated boric acid polymers (primarily $(HBO_2)_3$), is believed to attach to the dispersant as amine salts, e.g., the metaborate salt of said amine dispersants.

Treating is readily carried out by adding from about 0.05 to 4, e.g., 1 to 3 wt. % (based on the weight of said nitrogen compound) of said boron compound, preferably boric acid which is most usually added as a slurry to said nitrogen compound and heating with stirring at from about 135° C. to 190, e.g., 140°–170° C., for from 1 to 5 hours followed by nitrogen stripping at said temperature ranges. Or, the boron treatment can be carried out by adding boric acid to the hot reaction mixture of the dicarboxylic acid material and amine while removing water.

Since post-treating processes involving the use of these post-treating reagents is known insofar as application to reaction products of amine-containing ashless dispersants, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832, 3,344,069; 3,366,569; 3,373,111; 3,367,943; 3,390,086; 3,403,102; 3,428,561; 3,470,098; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,558,743; 3,573,205; 3,692,681; 3,749,695; 3,865,740; 3,954,639; 3,458,530; 3,390,086; 3,367,943; 3,185,704, 3,551,466; 3,415,750; 3,312,619; 3,280,034; 3,718,663; 3,652,616; 4,338,205; 4,428,849; 4,686,054; 4,839,070; 4,839,071; 4,839,072; 4,839,073; U.K. pat. No. 1,085,903; U.K. pat. No. 1,162,436.

The nitrogen containing dispersant materials of this invention can also be treated with polymerizable lactones (such as epsilon-caprolactone) to form dispersant adducts having the moiety $-[C(O)(CH_2)_zO]_mH$, wherein z is a number of from 4 to 8 (e.g., 5 to 7) and m has an average value of from about 0 to 100 (e.g., 0.2 to 20). The dispersants of this invention can be post-treated with a $C_5$ to $C_9$ lactone, e.g., epsilon-caprolactone, by heating a mixture of the dispersant material and lactone in a reaction vessel in the absence of a solvent at a temperature of about 50° C. to about 200° C., more preferably from about 75° C. to about 180° C., and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the $C_5$ to $C_9$ lactone, e.g., epsilon-caprolactone, is reacted with a dispersant material in a 1:1 mole ratio of lactone to dispersant material. In practice, the ration of lactone to dispersant material may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred. For optimum dispersant performance, sequences of from about 1 to about 5 lactone units in a row are preferred.

Catalysts useful in the promotion of the lactone-dispersant material reactions are selected from the group consisting of stannous octanoate, stannous hexanoate, tetrabutyl titanate, a variety of organic based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary of adducts formed by reaction of dispersant materials if this invention and epsilon-caprolactone are those adducts illustrated by the following equation:

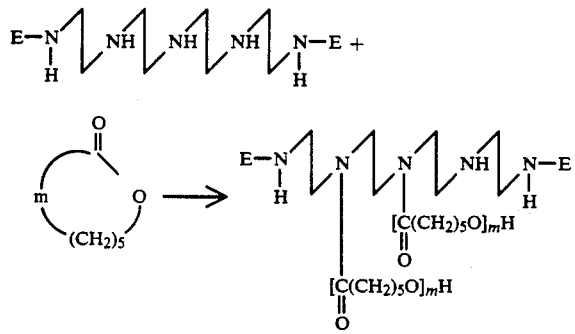

wherein m is as defined above and Wherein "E" is the polymer substituent group. The reactions of such lactones with dispersant materials containing nitrogen or ester groups is more completely described in U.S. Pat. Nos. 4,486,326; 4,820,432; 4,828,742; 4,851,524; 4,866,135; 4,866,139; 4,866,140; 4,866,141; 4,866,142; and 4,866,187, the disclosure of each of which is hereby incorporated by reference in its entirety.

Further aspects of the present invention reside in the formation of metal complexes of the novel dispersant additives prepared in accordance with this invention. Suitable metal complexes may be formed in accordance with known techniques of employing a reactive metal ion species during or after the formation of the present dispersant materials. Complex forming metal reactants include the metal nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be also found in U.S. Pat. Nos. 3,306,908 and Re. 26,433, the disclosures of which are hereby incorporated by reference in their entirety.

The processes of these incorporated patents, as applied to the compositions of this invention, and the post-treated compositions thus produced constitute a further aspect of this invention.

OLEAGINOUS COMPOSITIONS

The dispersants of the present invention can be incorporated into a lubricating oil (or a fuel in any convenient way. Thus, these mixtures can be added directly to the lubricating oil (or fuel) by dispersing or dissolving the same in the lubricating oil (or fuel) at the desired level of concentration of the dispersant. Such blending into the additional lubricating oil (or fuel) can occur at room temperature or elevated temperatures. Alternatively, the dispersants can be blended with a suitable oil-soluble solvent/diluent (such as benzene, xylene, toluene, lubricating base oils and petroleum distillates, including the various normally liquid fuels described in detail below) to form a concentrate, and then blending the concentrate with a lubricating oil (or fuel) to obtain the final formulation. Such dispersant concentrates will typically contain (on an active ingredient (A.I.) basis) from about 3 to about 45 wt. %, and preferably from about 10 to about 35 wt. %, dispersant additive, and typically from about 30 to about 90 wt. %, preferably from about 40 to 60 wt. %, base oil, based on the concentrate weight.

The oil-soluble additives of the present invention possess very good dispersant and antioxidant properties as measured herein in a wide variety of environments.

Accordingly, the additives are used by incorporation and dissolution into an oleaginous material such as fuels and lubricating oils. When the additives of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed. The properties of such fuels are well known as illustrated, for example, by ASTM Specifications D #396-73 (Fuel Oils) and D #439-73 (Gasolines) available from the American Society for Testing Materials ("ASTM"), 1916 Race Street, Philadelphia, Pa. 19103. Normally liquid fuel compositions comprising non-hydrocarbonaceous materials such as alcohols, ethers, organo-nitro compounds and the like (e.g., methanol, ethanol, diethyl ether, methyl ethyl ether, nitromethane) are also within the scope of the invention. Such materials can be mixed with the hydrocarbon fuel in varying amounts of up to about 10-20% or more. For example, alcohols such as methanol, ethanol, propanol and butanol, and mixtures of such alcohols are included in commercial fuels in amounts of up to about 10%. Other examples of materials which can be mixed with the fuels include diethyl ether, methyl ethyl ether, methyl tertiary butyl ether, and nitromethane. Also within the scope of the invention are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, antioxidants such as 2,6-ditertiar-butyl-4-methylphenol, rust inhibitors, bacteriostatic agents, gum inhibitors, metal deactivators, upper cylinder lubricants and the like.

The additives of the present invention find their primary utility in lubricating oil compositions which employ a base oil in which the additives are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

These lubricating oil formulations conventionally contain several different types of additives that will supply the characteristics that are required in the formulations. Among these types of additives are included viscosity index improvers, antioxidants, corrosion inhibitors, detergents, dispersants (especially ashless dispersants such as polyisobutylene succinimides and borated derivatives thereof), pour point depressants, antiwear agents, friction modifiers, etc. as described in U.S. Pat. No. 4,797,219, the disclosure of which is hereby incorporated by reference in its entirety. Some of these numerous additives can provide a multiplicity of effects, e.g., a dispersant-oxidation inhibitor. This approach is well known and need not be further elaborated herein.

In the preparation of lubricating oil formulations it is common practice to introduce the additives in the form of 10 to 80 wt. %, e.g., 20 to 80 wt. % active ingredient concentrates in hydrocarbon oil, e.g. mineral lubricating oil, or other suitable solvent. Usually these concentrates may be diluted with 3 to 100, e.g., 5 to 40 parts by weight of lubricating oil, per part by weight of the additive package, in forming finished lubricants, e.g., crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The additives of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyolethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tertbutylphenyl)silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Compositions when containing these conventional additives are typically blended into the base oil in amounts effective to provide their normal attendant function. Representative effective amounts of such additives (as the respective active ingredients) in the fully formulated oil are illustrated as follows:

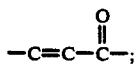

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention. The PACM oligomer employed below is substantially free of organic solvent (less than about 1 wt. % polar organic solvent).

EXAMPLE 1

About 200 g. of a polyisobutenyl-substituted succinic anhydride derived from a polyisobutylene ($\overline{M}_n$ of 960) and having a Saponification No. of 107 (90 wt. % active ingredient) was mixed with 39.9 g. of PACM oligomer (containing 12.1 wt. % total nitrogen) and 189.2 g. of mineral lubricating oil (S150N). The reactants were therefore charged in a PIBSA:primary amine mole ratio of 1:1. The reaction mixture was then heated to 150° C. for four hours while under light nitrogen stripping. The product was then nitrogen stripped for one hour and filtered. The oil solution analyzed for 0.90 wt. % N and kinematic viscosity of 231.6 cSt at 100° C.

EXAMPLE 2

About 300 g of a polyisobutenyl-substituted succinic anhydride derived from a polyisobutylene ($\overline{M}_n$ of 1300) having a Saponification No. of 69 (59 wt. % AI) was mixed with 38.65 g of PACM oligomer (containing 12.1 wt. % total nitrogen) and 95.4 g. of mineral lubricating oil (S150N). The reactants were therefore charged in a PIBSA:primary amine mole ratio of 1:1. The reaction mixture was then heated to 150° C. for four hours with light nitrogen stripping. The product was then stripped for one hour and filtered. It analyzed for 0.86 wt. % nitrogen and a kinematic viscosity of 422.4 cSt at 100° C.

EXAMPLE 3

About 200 g. of a polyisobutenyl-substituted succinic anhydride derived from a polyisobutylene ($\overline{M}_n$ of 2225) having a Saponification No. of 52.2 (77.7 wt. % AI) was mixed with 19.5 g. of PACM oligomer (containing 12.1 wt. % total nitrogen) and 121 g. of mineral lubricating oil (S150N). The reactants were therefore charged in a PIBSA:primary amine mole ratio of The reaction mixture was then heated to 150° C. for four hours while nitrogen stripping. The product was filtered and collected. It analyzed for 0.76 wt. % nitrogen and has a kinematic viscosity of 1053 cSt at 100° C.

EXAMPLES 4-5

The procedure of Example 3 was repeated in separate runs except that the polyisobutenyl succinic anhydride (PIBSA) and PACM oligomer were contacted in a PIBSA:primary amine mole ratio of either 1:1 (Ex. 4) or 1:2 (Ex. 5).

COMPARATIVE EXAMPLES 6-7

The procedure of Examples 4-5, respectively, were repeated in separate runs except that bis(para-amino cyclohexyl) methane ("monomer") was used instead of the PACM oligomer, in a PIBSA:PACM monomer molar ratio of either 1:1 (Comp. Ex. 6) or 1:2 (Comp. Ex. 7).

The following lubricating oil compositions were prepared using the dispersants of Examples 1-5, Comparative Examples 6-7, and comparative materials comprising commercial dispersants (A)-(C). The resulting compositions were then tested for sludge inhibition (via the SIB test) and varnish inhibition (via the VIB test), as described below.

The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that is driven generally for short trips only, thereby causing a buildup of a high concentration of sludge precursors. The oil that was used contained only a refined base mineral lubricating oil, a viscosity index improver, a pour point depressant and zinc dialkyldithiophosphate anti-wear additive. The oil containing no sludge dispersant. A quantity of such used oil was acquired by draining and refilling the taxicab crankcase at 1000-2000 mile intervals.

The SIB test was conducted in the following manner: the aforesaid used crankcase oil, which was milky brown in color, was freed of sludge by centrifuging for one hour at about 39,000 gravities (gs.). The resulting clear bright red supernatant oil was then decanted from the insoluble sludge particles thereby separated out. However, the supernatant oil still contained oil-soluble sludge precursors which on heating under the conditions employed by this test will tend to form additional oil-insoluble deposits of sludge. The sludge inhibiting properties of the additives being tested were determined by adding to portions of the supernatant used oil, a small amount, such as 0.5, 1 or 2 weight percent, of the particular additive being tested. Ten grams of each blend being tested were placed in a stainless steel centrifuge tube and are heated at 135° C. for 16 hours in the presence of air. Following the heating, the tube containing the oil being tested was cooled and then centrifuged for about 30 minutes at room temperature at about 39,000 gs. Any deposits of new sludge that form in this step were separated from the oil by decanting the supernatant oil and then carefully washing the sludge deposits with 25 ml of heptane to remove all remaining oil from the sludge and further centrifuging. The weight of the new solid sludge that has been formed in the test, in milligrams, was determined by drying the residue and weighing it. The results were reported as amount of precipitated sludge in comparison with the precipitated sludge of a blank not containing any additional additive, which blank was normalized to a rating of 10. The less new sludge precipitated in the presence of the additive, the lower the SIB value and the more effective was the additive as a sludge dispersant. In other words, if the additive gave half as much precipitated sludge as the blank, then it would be rated 5.0 since the blank will be normalized to 10.

The VIB test was used to determine varnish inhibition. Here, each test sample consisted of 10 grams of lubricating oil containing a small amount of the additive being tested. The test oil to which the additive was admixed was of the same type as used in the above-described SIB test. Each ten gram sample was heat soaked overnight at about 140° C. and thereafter centrifuged to remove the sludge. The supernatant fluid of each sample was subjected to heat cycling from about 150° C. to room temperature over a period of 3.5 hours at a frequency of about 2 cycles per minute. During the heating phase, gas which was a mixture of about 0.7 volume percent SO₂, 1.4 volume percent NO and balance air was bubbled through the test samples. During the cooling phase, water vapor was bubbled through the test samples. At the end of the test period, which testing cycle can be repeated as necessary to determine the inhibiting effect of any additive, the wall surfaces of the test flasks in which the samples were contained were visually evaluated as to the varnish inhibition. The amount of varnish imposed on the walls was rated to values of from 1 to 11 with the higher number being the greater amount of varnish, in comparison with a blank with no additive that is rated 11.

10.00 grams of SIB test oil were mixed with 0.05 grams of the products of the Examples as described and tested in the aforedescribed SIB and VIB tests. The data thereby obtained are summarized in Table II below.

TABLE II

| Example | SIB/VIB Results | | |
|---|---|---|---|
| | N | SIB | VIB |
| 1 | 0.90 | 8.52 | 4 |
| A[1] | 1.56 | 7.74 | 7 |
| 2 | 0.86 | 6.22 | 3.5 |
| B[2] | 0.98 | 6.37 | 5 |

TABLE II-continued

| Example | SIB/VIB Results | | |
|---|---|---|---|
| | N | SIB | VIB |
| 3 | 0.76 | 5.44 | 3.5 |
| C[3] | 0.88 | 6.33 | 4.5 |
| 4 | 0.76 | 1.67 | 3 |
| 5 | 1.1 | 0.38 | 3 |
| Comp. 6 | 0.63 | 5.83 | 4 |
| Comp. 7 | 0.39 | 6.63 | 5 |

[1] Commercial borated polyisobutenyl succinimide dispersant derived from 950 $\overline{M}_n$ PIB and polyethylene polyamine.
[2] Commercial borated polyisobutenyl succinimide dispersant derived from 1300 $\overline{M}_n$ PIB and polyethylene polyamine.
[3] Commercial borated polyisobutenyl succinimide dispersant derived from 2200 $\overline{M}_n$ PIB and polyethylene polyamine.

This is particularly so for dispersants of the present invention wherein the olefin polymer substituent is derived from polyolefins having $\overline{M}_n$ of at least about 1300.

The above data thereby obtained show that the dispersants of this invention have good SIB/VIB performance and sludge and varnish inhibiting properties.

The improved inertness to fluoroelastomer seals was measured in test oils (S150N mineral oil) containing 6 wt. % of the dispersant candidate was used. These test oils were used to age Viton fluoroelastomer test samples for 7 days at 150° C. The change in the elongate of the test samples was measured, and the data thereby obtained is summarized in Table III below.

TABLE III

| Test Oil Containing Dispersant of Example | Wt. % N[1] | Average Change in Elongation |
|---|---|---|
| 4 | 0.76 | −11.2 |
| 5 | 1.1 | −56.1 |
| Comp. Ex. 6 | 0.63 | −49.8 |
| Comp. Ex. 7 | 0.39 | −2.89 |
| A[1] | 1.56 | −23.9 |
| D[2] | 1.56 | −25.6 |
| C[3] | 0.88 | −19.8 |
| E[4] | 0.88 | −26.1 |

[1] Commercial borated polyisobutenyl succinimide dispersant derived from 950 $\overline{M}_n$ PIB and polyethylene polyamine.
[2] Same as (1) but non-borated.
[3] Commercial borated polyisobutenyl succinimide dispersant derived from 2200 $\overline{M}_n$ PIB and polyethylene polyamine.
[4] Same as (3) but non-borated.

A series of lubricating formulations were prepared which contained 6 vol % of the novel dispersants formed in Examples 1–5, respectively. Each lubricating composition also contained mineral lubricating oil, a mixture of overbased Mg sulfonate detergent inhibitor and overbased Ca sulfonate detergent inhibitor, zinc dialkyl dithiophosphate antiwear agent, antioxidant and ethylene propylene viscosity index improver.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. Dispersant adduct useful in lubricating oils comprising reaction products of (A) polymer-substituted mono- or dicarboxylic acid or anhydrides derived from the reaction of (i) polyolefin with (ii) monounsaturated carboxylic reactant and (B) bis (para-amino cyclohexyl) methane oligomers; said reaction being conducted in a manner and under conditions sufficient to formimide, amide or mixtures thereof.

2. The dispersant adduct according to claim 1 wherein the polymer comprises polybutylene.

3. The dispersant adduct according to claim 2 wherein the polymer comprises polyisobutylene.

4. The dispersant adduct according to claim 1 wherein the reactant (A) comprises a polymer-substituted succinic acid or anhydride.

5. The dispersant adduct according to claim 4 wherein reactant (A) is derived by the reaction of maleic anhydride and a polybutylene having a number average molecular weight of from about 1,300 to 3,000.

6. The dispersant adduct according to claim 1 wherein the reactant (B) contains from about 8 to 16 wt. % total N.

7. The dispersant adduct according to claim 1 wherein the dispersant adduct contains at least one primary or secondary amino group per molecule.

8. The dispersant adduct according to claim 7 wherein the dispersant adduct contains from 1 to 15 primary or secondary amine groups per molecule.

* * * * *